(12) United States Patent
McCarthy, III (10) Patent No.: US 9,047,632 B2
(45) Date of Patent: Jun. 2, 2015

(54) APPARATUS, SYSTEMS AND METHODS FOR FACILITATING SHOPPING FOR ITEMS SHOWN IN MEDIA CONTENT EVENTS

(75) Inventor: Bernard A. McCarthy, III, Atlanta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 537 days.

(21) Appl. No.: 13/091,957

(22) Filed: Apr. 21, 2011

(65) Prior Publication Data

US 2012/0272268 A1    Oct. 25, 2012

(51) Int. Cl.
| | |
|---|---|
| G06F 3/00 | (2006.01) |
| G06F 13/00 | (2006.01) |
| H04N 5/445 | (2011.01) |
| H04N 21/254 | (2011.01) |
| H04N 21/478 | (2011.01) |
| G06Q 30/06 | (2012.01) |

(52) U.S. Cl.
CPC ....... *G06Q 30/0621* (2013.01); *H04N 21/2542* (2013.01); *H04N 21/478* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 6,868,415 B2 * | 3/2005 | Kageyama et al. | 1/1 |
| 8,046,803 B1 * | 10/2011 | Lee | 725/60 |
| 2002/0162120 A1 * | 10/2002 | Mitchell | 725/135 |
| 2003/0070179 A1 * | 4/2003 | Ritz et al. | 725/119 |
| 2003/0126607 A1 * | 7/2003 | Phillips et al. | 725/55 |
| 2006/0230123 A1 | 10/2006 | Simmons et al. | |
| 2008/0134063 A1 * | 6/2008 | Volach | 715/762 |
| 2009/0034784 A1 | 2/2009 | McQuaide, Jr. | |
| 2009/0254946 A1 * | 10/2009 | Vogel | 725/60 |

* cited by examiner

*Primary Examiner* — Mark D Featherstone
(74) *Attorney, Agent, or Firm* — Lowe Graham Jones PLLC (57) ABSTRACT

Techniques for facilitating shopping for items shown in media content events are described. Some embodiments provide a shopping facilitator as part of a media device, such as a set-top box. As the media device presents a media content event showing multiple items, the shopping facilitator is configured to receive an indication that a viewer is interested in purchasing one of the multiple items. The shopping facilitator then identifies the item of interest, and at a later time provides a shopping facility that can be can be used by the viewer or some other user to purchase the item. In some embodiments, the media content event is presented without any indication that items shown in the media content event are for sale. Furthermore, the shopping facilitator may perform its functions without interrupting or otherwise disrupting the viewing of the media content event.

20 Claims, 8 Drawing Sheets

| | Program ID | Item ID | Item Name | Begin Time | End Time |
|---|---|---|---|---|---|
| 304a | 1233 | 101 | ABC Brand Laptop Computer | 00:14:15 | 00:14:35 |
| 304b | 1233 | 101 | ABC Brand Laptop Computer | 01:23:02 | 01:23:32 |
| 304c | 1233 | 122 | Tie | 00:14:12 | 00:14:45 |
| 304d | 1233 | 122 | Tie | 00:56:54 | 00:57:15 |
| 304e | 1233 | 443 | DEF Brand Eyeglasses | 00:14:12 | 00:14:50 |
| 304f | 3352 | 233 | XYZ Brand Smartphone | 01:10:22 | 01:10:37 |
| 304g | 3352 | 631 | JKL Brand Luxury Sedan | 00:03:45 | 00:04:34 |
| 304h | ... | | | | |

APPARATUS, SYSTEMS AND METHODS FOR FACILITATING SHOPPING FOR ITEMS SHOWN IN MEDIA CONTENT EVENTS

BACKGROUND

A number of approaches exist for providing shopping functionality to viewers of media content events, such as television shows or movies. In some approaches, an available item appearing in a media content event is flagged or indicated as such, by way of a marker, message, tag, or the like. Then, the user enters a shopping mode or similar state, in order to select an item to purchase. In some approaches, items are selected by entering an item identifier (e.g., a tag number displayed on the screen) via a keyboard.

Such approaches have a number of drawbacks. First, indicating items as being for sale by way of markers or tags may disrupt the viewing experience by cluttering the screen or otherwise destroying the aesthetic experience presented by the media content event. Second, entering item identifiers such as tag numbers can be time consuming and error-prone or frustrating, particularly in the low-light environments often used for video viewing.

SUMMARY

Systems and methods for facilitating shopping for items shown in media content events are disclosed. An exemplary embodiment presents, by a media device, a media content event that shows multiple items without indications that any of the multiple items are available for purchase; at a time occurring during the presentation of the media content event, receives an indication that a viewer of the media content event is interested in purchasing an item shown by the media content event; identifies, based at least in part on the time, one or more of the multiple items, the identified one or more items being shown by the media content event at about the time and including the item that the user is interested in purchasing; and stores indications of the identified one or more items.

BRIEF DESCRIPTION OF THE DRAWINGS

Preferred and alternative embodiments are described in detail below with reference to the following drawings.

DETAILED DESCRIPTION

Example embodiments described herein facilitate shopping for items that are presented in media content events. Some embodiments provide a shopping facilitator that is configured to receive an indication that a user (e.g., viewer) is interested in an item shown by a media content event. In response, the shopping facilitator identifies the item in the media content event, and further provides information about the identified item and/or controls with which the user can initiate a transaction for the identified item. In some embodiments, the shopping facilitator provides a shopping facility (e.g., an online store) that is personalized for a user and that is populated with items indicated by the user as potential acquisitions.

Figure 1:
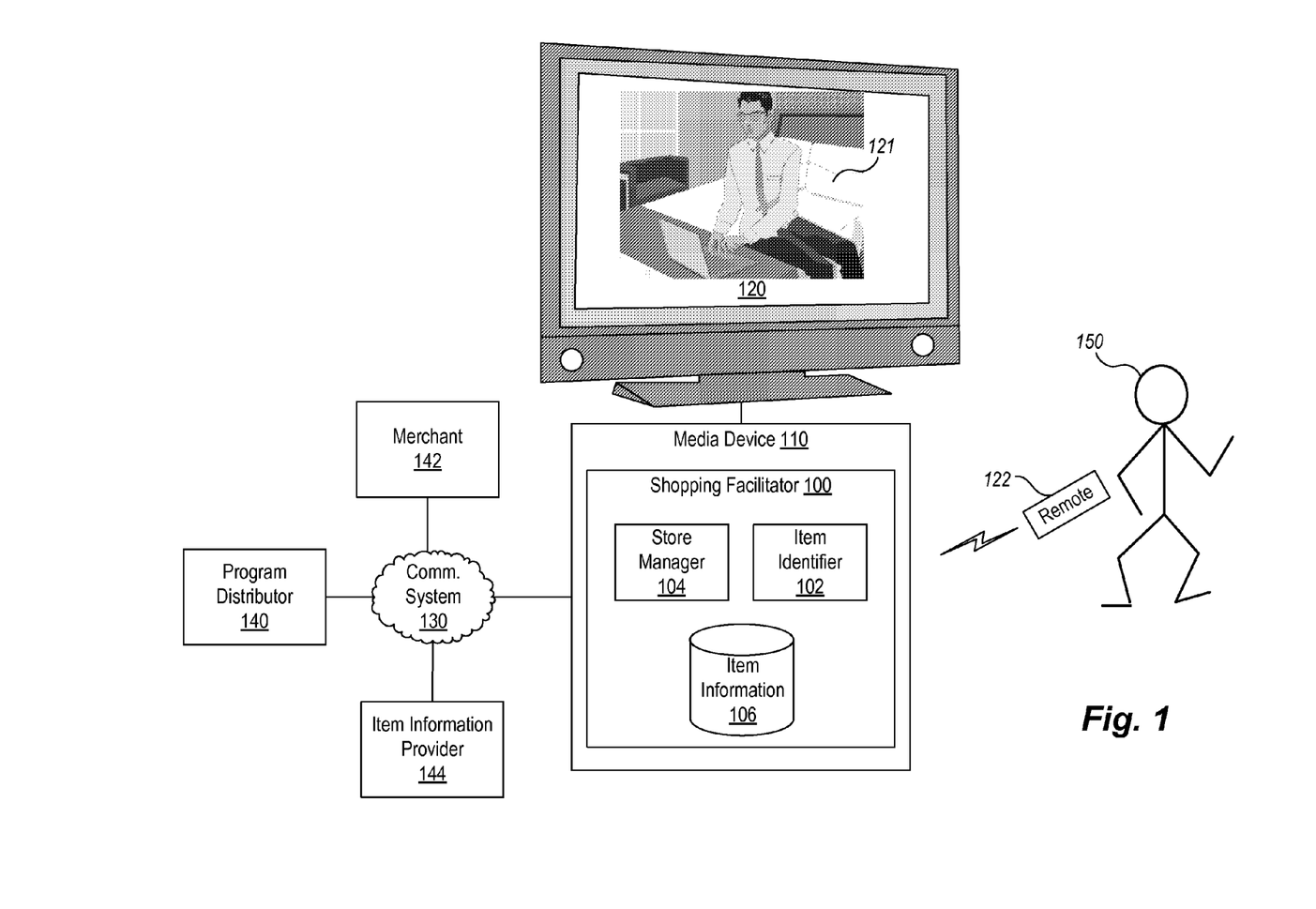
FIG. 1 is a block diagram illustrating functional elements of an example embodiment of a shopping facilitator.

FIG. 1 is a block diagram illustrating functional elements of an example embodiment of a shopping facilitator 100 executing as part of a media device 110. The media device 110 is communicatively coupled, via a communications system 130, to a program distributor 140, a merchant 142, and an item information provider 144. The media device 110 is also communicatively coupled to a presentation device 120. The media device 110 receives media content events from the program distributor 140, and presents received media content events on the presentation device 120. A user (or viewer) 150 interacts with the media device 110 via a remote control device 122, such as by selecting media content events, adjusting the volume, initiating recordings, and the like. Media content events may include movies, news programs, sporting events, serial comedies or dramas, and other program events that are communicated to the media device 110. Media content events may include video data, audio data, text, and/or computer instructions.

The shopping facilitator 100 facilitates shopping for items shown in media content events presented by the media device 110. In particular, the shopping facilitator 100 identifies items that are shown in media content events and that are of potential interest to the user 150. The shopping facilitator 100 then provides information about the identified items, such as by providing a shopping facility, such as an online store, that is populated with information about, and/or controls for purchasing, the identified items. The shopping facilitator 100 includes an item identifier 102, a store manager 104, and item information 106. The item identifier 102 identifies items appearing in media content events shown by the media device 110. In some embodiments, the item identifier 102 identifies items based on meta-information stored as item information 106. Such meta-information may be received from the item information provider 144 and/or the program distributor 140. The store manager 104 manages (e.g., records, stores) items selected by the user 150 and provides a shopping facility or other user interface that can be used by the user 150 to purchase such items.

In one example usage scenario, a scene 121 in a media content event shown on presentation device 120 may show multiple items, such as a laptop computer, eyeglasses, a chair, a tie, and the like. If the user 150 is interested in purchasing or obtaining information about one of the shown items, such as the laptop computer, the user 150 may indicate such an interest via the remote control device 122. By pressing a button or providing other input (e.g., a voice command), the user 150 causes the remote control device 122 to transmit an indication that the user is interested in purchasing some item shown by the media content event. The shopping facilitator 100 receives the transmitted indication, and in response, identifies one or more items that are shown at about the time that the indication was received. Then, the shopping facilitator 100 stores indications of the identified items. At a later time, the shopping facilitator 100 provides information about the identified items to the user 150, such as by providing a shopping facility (e.g., an online store, an electronic marketplace, a shopping Website) that includes information about the identified items. By using the provided shopping facility, the user 150 can elect to purchase one or more of the identified items.

Note that in some embodiments, items shown in a media content event are displayed without any indications that any of the items are available for purchase. In other words, items are not annotated, flagged, or otherwise denoted as being available for purchase. Thus, using the described techniques, the user's viewing experience is not cluttered, distracted, or otherwise disrupted by the shopping services provided by the shopping facilitator 100. Furthermore, in some embodiments, the user can indicate interest in purchasing items without pausing, stopping, entering into another mode or state (e.g., a shopping mode), or otherwise disrupting the flow or aesthetic experience of the media content event.

The item identifier 102 of the shopping facilitator 100 may identify items in a media content event in various ways. In one embodiment, the item identifier 102 identifies items with reference to metadata provided with the media content event. The metadata may include indications of items that are associated with times at which those items appear in the media content event. Then, when the shopping facilitator 100 receives an indication at a particular time during the presentation of the media content event, the item identifier 102 can identify one or more items shown at about that time. In some embodiments, the indications of, or information about, the identified items may be stored, in a manner transparent to the user 150, until a later time when the user 150 visits the shopping facility provided by the store manager 104. In other embodiments, the user 150 may be presented with a list of multiple items appearing at about the time when the user 150 indicated interest in purchasing an item shown in the media content event, along with a request to select one or more of the multiple items. In further embodiments, the item identifier 102 may utilize image processing techniques to identify one or more items appearing at about the time when the user 150 indicated his interest. For example, the item identifier 102 may perform object recognition to automatically identify items shown in a scene or frame of a media content event. Such object recognition may be performed in off-line manner, such as when the media device 110 does not have sufficient processing capabilities to perform potentially computationally intensive image recognition.

The media device 110 and the shopping facilitator 100 also interact via the communication system 130 which the merchant 142 and/or the item information provider 144. In particular, the store manager 104 may facilitate transactions between the user 150 and the merchant 142. For example the store manager 104 may display a link or other control to access the merchant 142, for purposes of initiating a purchase for a particular item and/or obtaining more information about the item. The shopping facilitator 100 may also receive information about items shown in media content events from the item information provider 144, such as metadata that identifies items in media content events. Such metadata may be stored as item information 106 for use by the item identifier 102. In other embodiments, the item information provider 144 may instead or in addition perform object recognition or other image processing techniques, to automatically identify items in media content events, as discussed above. In some embodiments, metadata or other information about items shown in media content events is instead or in addition received by the shopping facilitator 100 from the program distributor 140. For example, the program distributor 140 may include such information as part of a program signal or stream transmitted to the media device 110.

Information about items identified by the shopping facilitator 100 may be accessed by the user 150 in various ways. For example, information about identified items may be accessed concurrently with the presentation of a media content event or any later time. In one embodiment, the user 150 may pause or stop the media content event to obtain more information about an item shown in a particular scene. In another embodiment, the item identifier 102 stores indications of items for later access by the user via the store manager 104. Also, the user 150 may access information about identified items via the presentation device 120 or some other device. In particular, the user 150 may later access information via some other computing device, such as a laptop computer, a mobile phone, or a desktop computing system. In some embodiments, identified items are presented by the store manager 104 via a Website, such that they may be accessed from various types of computing devices or from various locations. In other embodiments, the user 150 may access items via a special-purpose program or component, such as an "app" executing on a smart phone or other mobile device (e.g. a tablet computer).

Various users can concurrently interact with the shopping facilitator 100. For example, two or more people viewing a media content event can indicate interest in purchasing items by using different devices. In one embodiment, a first user can use the remote control device 122, while a second user can use some other device, such as a second remote control device, a smart phone, laptop computer, or the like, in order to transmit indications of interest to the shopping facilitator 100. The shopping facilitator 100 can associate indications received from distinct devices with corresponding users of those devices, in order to provide distinct shopping facilities (e.g., stores) for those users. Then, the shopping facilitator 100 can provide distinct shopping facilities for the first and second users, each shopping facility customized for a corresponding user based on the indications of interest received from that user.

The illustrated media device 110 is a set-top box ("STB"). In other embodiments, the media device 110 is or includes a television ("TV"), a digital video disc ("DVD") player, a DVD recorder, a game playing device, or a personal computer ("PC"). As noted, the media device 110 receives media content events from the program distributor 140 via the communications system 130. The communications system 130 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. In some embodiments, the media device 110 includes multiple communication ports, such as a first port for receiving an RF signal (e.g., from a satellite or terrestrial broadcast system) from the program distributor 140 and a second port (e.g., Ethernet) for communicating with other systems via the Internet or other networks.

The described techniques are not limited to the particular architecture shown in FIG. 1. For example, all or part of the shopping facilitator 100 may reside on a computing system that is remote from the media device 110. In one embodiment, part of the shopping facilitator 100, such as the item identifier 102, resides at the item information provider 144 and/or the program distributor 140. In another embodiment, the store manager 104 resides at the merchant 142 or in some other location. In addition, various types of program distributors 140 are contemplated, including broadcasters of digital and/or analog media content events, such as satellite broadcasters, over-the-air (terrestrial) broadcasters, cable systems, and the like. Also, the program distributor 140 may be or include interactive and on-demand systems, such as Internet video streaming or download services. In yet other embodiments, the media device 110 obtains media content events locally, such as from a storage device on the media device, including a DVD, hard disk, or the like. In this manner, the techniques can be used to provide shopping functionality while viewing a DVD.

Figure 2A:
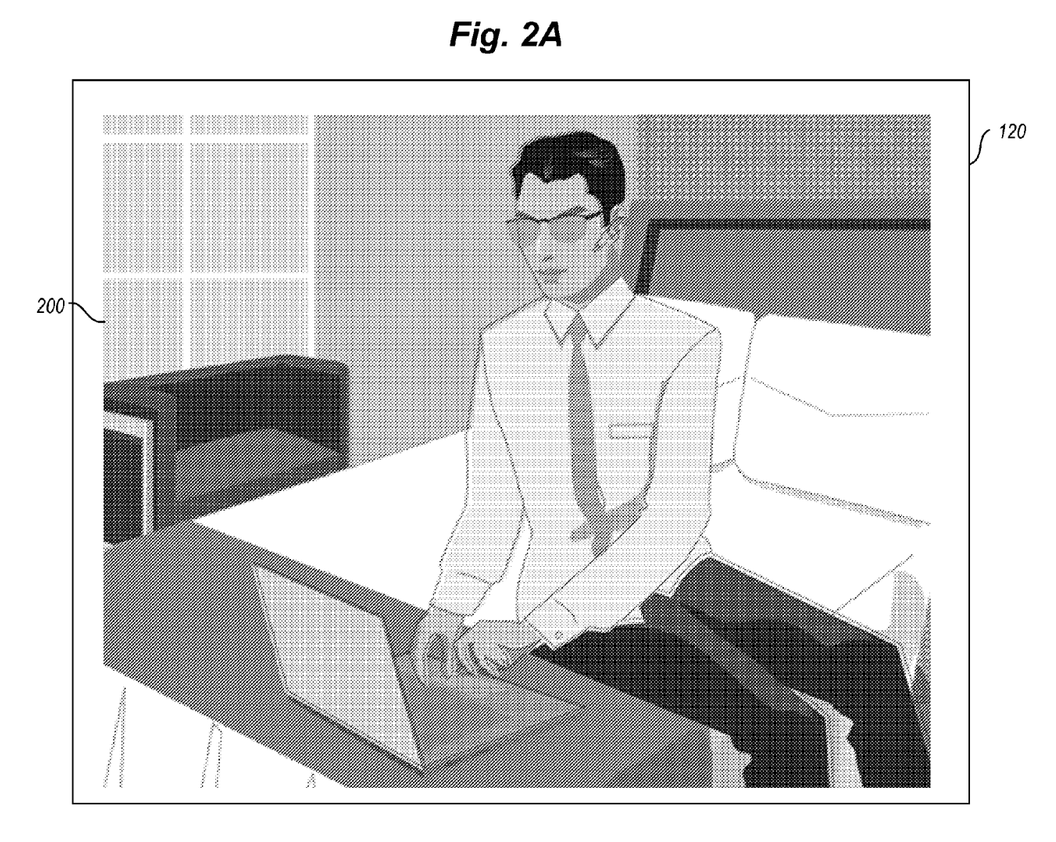
FIGS. 2A-2D illustrate example user interface screens provided by example embodiments.

FIGS. 2A-2D illustrate example user interface screens provided by example embodiments. In particular, FIG. 2A shows a scene 200 displayed on a presentation device 120. The scene 200 depicts a man typing on a laptop computer. The scene includes a laptop computer, eye glasses, a shirt, a tie, a headset (earpiece), along with other items. At the time that scene 200 is shown on the presentation device 120, the user 150 indicates that he is interested in purchasing or obtaining information about one or more of the items shown in the scene 200. The user 150 may make such an indication in various ways, such as by pressing a button on a remote control device 122.

When the shopping facilitator 100 receives the indication that the user is interested in an item shown in the scene 200, the shopping facilitator 100 may respond in various ways. In one embodiment, the shopping facilitator 100 may silently or transparently (to the user) store the received indication of interest, an identifier of the media content event being presented, and a time at which the indication was received. This information may be used to then, or at a later time, determine which items were shown in the scene 200. In other embodiments, as discussed further below with reference to FIGS. 2B and 2C, the shopping facilitator 100 may provide at least some feedback to the user that an indication of interest was received.

Figure 2B:
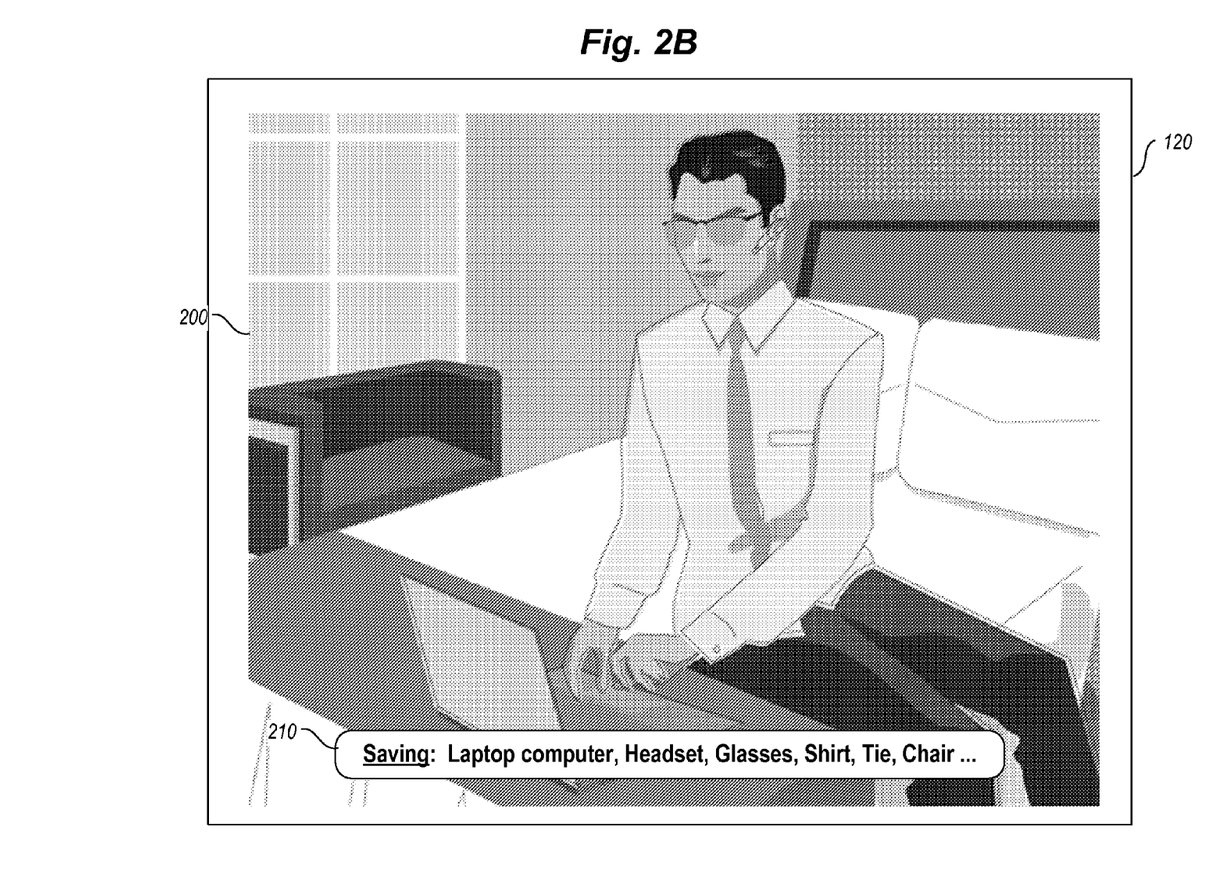

FIG. 2B illustrates feedback given by one embodiment in response to an indication of item interest received from a user. In particular, FIG. 2B shows the scene 200 displayed on the presentation device 120, along with a message box 210. The message box 210 displays indications of items shown in the scene 200 that are being saved or otherwise stored by the shopping facilitator 100 for later access by the user. The message box 210 is displayed in response to an indication of interest received from the user 150. In such an embodiment, the shopping facilitator 100 does not determine specifically which item is of interest to the user. Rather, the shopping facilitator 100 stores indications of one or more items that are shown at about the time that the indication of interest is received from the user 150.

The message box 210 is in some embodiments displayed for a brief time (e.g., less than 5 seconds, less than 10 seconds) in order to provide feedback that items have been selected for later access by the user, without unduly disrupting the viewing experience. Note also that the message box 210 is in this example may be placed unobtrusively near the bottom of the screen (or some other location that does not obstruct the user's view), so as to provide minimal disruption of the user's viewing experience. In other embodiments, iconic or audio feedback may be employed, such as by playing a beep or briefly displaying an icon to indicate that items have been selected for later access.

Figure 2C:
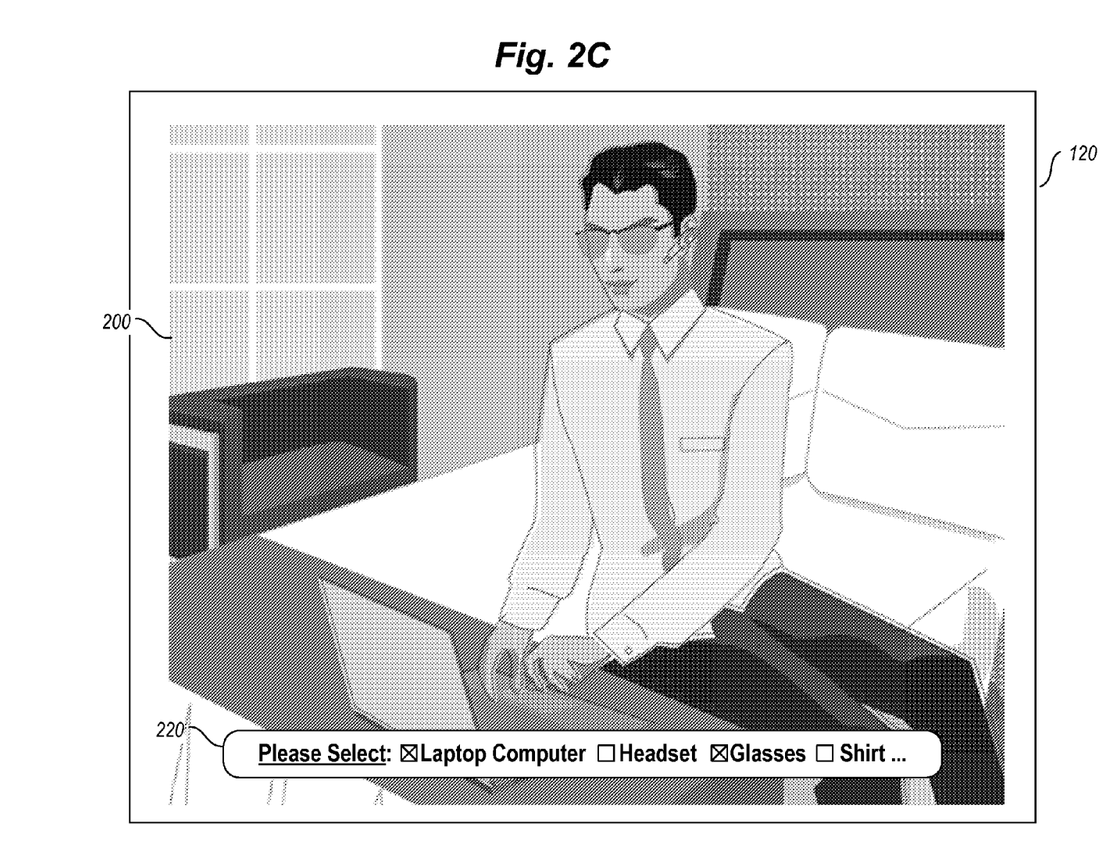

FIG. 2C illustrates feedback given by another embodiment in response to an indication of interest received from a user. In particular, FIG. 2C shows the scene 200 displayed on the presentation device 120, along with a selection box 220. The selection box 220 displays indications of items shown in the scene 200 along with checkboxes that may be selected or activated by the user 150 to further specify items that are of interest. The selection box 220 is displayed in response to an indication of interest received from the user 150, and is populated with one or more items that are shown at about the time that the indication of interest is received from the user 150. The user 150 can then make appropriate selections in the selection box 220 to specify the items that should be saved for later viewing or purchase.

Note here that the selection box 220 is also placed unobtrusively near the bottom of the screen, so as to provide minimal disruption of the viewing experience. Also, in some embodiments, the selection box 220 may, after a time period, time out and disappear from view. Various actions are contemplated at time out, such as automatic selection of all items, automatic de-selection of all items, or the like. Such actions can in some embodiments be configured by the user.

Figure 2D:
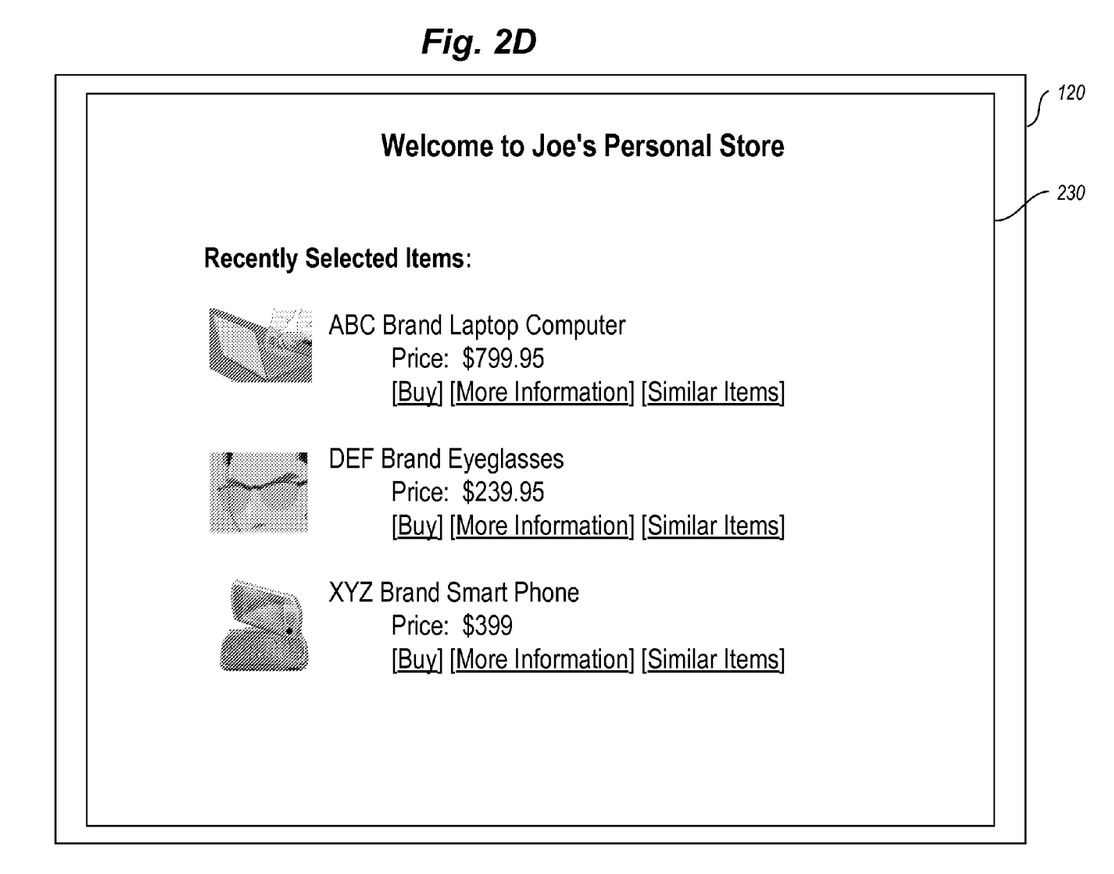

FIG. 2D illustrates a shopping facility provided by example embodiment of a shopping facilitator 100. In particular, FIG. 2D shows a screen 230 displayed on the presentation device 120. The screen 230 provides a shopping facility that is populated with items selected by the user from media content events viewed by the user. The screen 230 includes information about recently selected items of interest. In this example, information about three items is displayed. The three items include an ABC brand laptop computer, DEF brand eyeglasses, and an XYZ brand smart phone. Information about each item includes a name or description of the item, a price, along with controls (e.g., links) that can be selected by the user to buy the item, obtain more information about the item, or access information about similar items. For example, if the user is interested in purchasing the DEF brand eyeglasses, the user can select the "Buy" link to access a transaction page or other user interface for initiating a transaction for the item. As another example, the user can select the "Similar Items" link in order to obtain information about laptop computers that are similar to the ABC brand laptop computer displayed on the screen 230.

Figure 3:
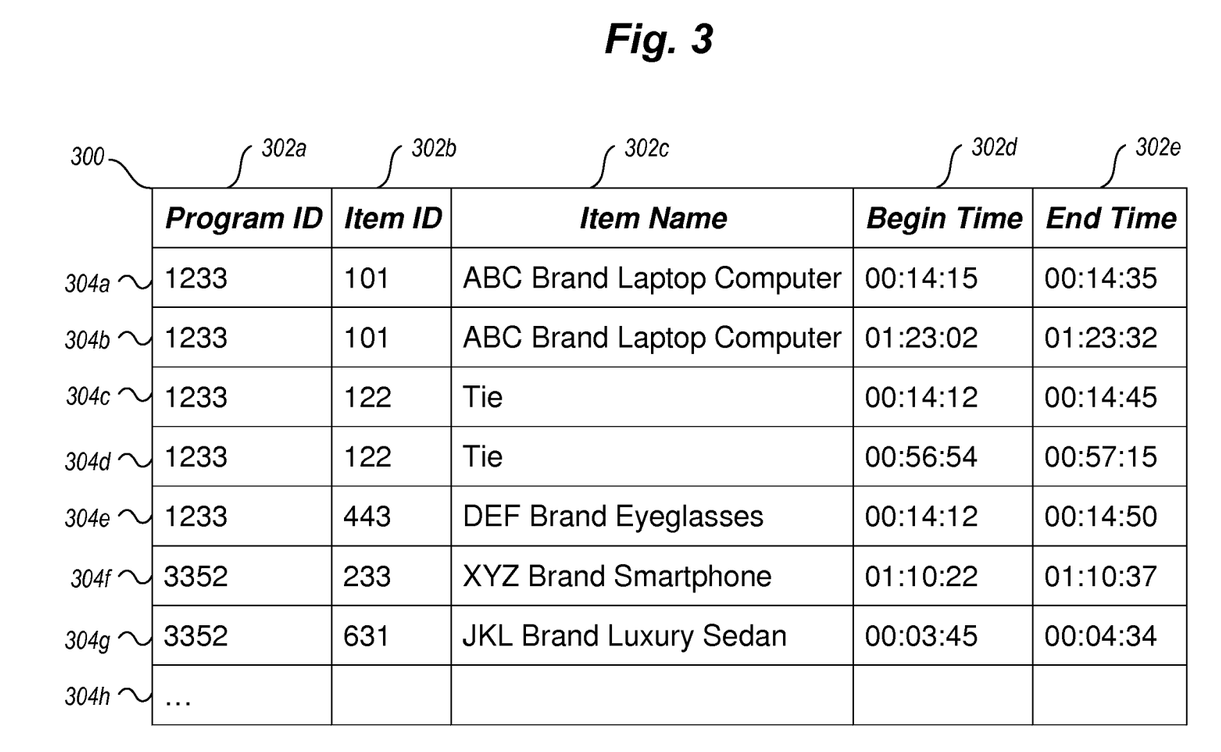
FIG. 3 illustrates example data processed by an example embodiment.

FIG. 3 illustrates example data processed by an example embodiment. In particular, FIG. 3 shows a table 300 that includes rows 304a-304h that store item information (e.g., metadata). Each row 304a-304h includes information about an item that is shown at some time during a media content event. In particular, each row 304a-304h includes a program identifier ("ID") field 302a that identifies a media content event, and item identifier ("ID") field 302b, item name field 302c, a begin time field 302d, and an end time field 302e. For example, row 304a indicates that the ABC brand laptop computer, having item ID 101 is shown in a media content event having program ID 1233, starting at 14 minutes and 15 seconds, and ending at 14 minutes and 35 seconds. Row 304b indicates that the same ABC brand laptop computer (as discussed with reference to row 304a) is shown again at a later time in program 1233, starting at one hour, 23 minutes, and 2 seconds, and ending at one hour, 23 minutes, and 32 seconds. Similarly, rows 304c and 304d represent information about two appearances of a tie having item ID on 122 in program 1233. Also, row 304e indicates that DEF brand eyeglasses are shown in program 1233 14 minutes and 12 seconds, and ending at 14 minutes and 50 seconds. Rows 304f and 304g store information about other items shown in other media content events.

In one embodiment, the shopping facilitator 100 may use the item information shown in table 300 in the following manner to identify items of potential interest to a user. The shopping facilitator 100 receives an indication of interest including an indication of a media content event, such as a program identifier, and a time at which the indication of interest was generated, received, transmitted, or the like. The shopping facilitator 100 then uses the received program identifier and the time to identify (e.g., select, find) in table 300 one or more items shown by the media content event at about that time (e.g., within 5 seconds, within 10 seconds, within 30 seconds, within one minute). In the example of FIG. 2A, the shopping facilitator 100 may receive a program identifier of 1233 and a time of 14 minutes and 30 seconds. Using this information together with that in table 300, the shopping facilitator 100 determines that the ABC Brand Laptop Computer (from row 304a), the Tie (from row 304c), and the DEF Brand Eyeglasses (from row 304e) are shown by the media content event at the received time.

The time received by the shopping facilitator 100 may be somewhat later than the actual time at which an item of interest appeared in a given media content event, due to a delay between when the item appeared and when the user indicated interest by pressing a button or other input device. To account for such a delay, the shopping facilitator 100 may search for items in table 300 that appear within a time window, interval, or duration around (e.g., before, after, before and after) the received time. Thus, if the received time was 14 minutes and 30 seconds, the shopping facilitator, may select all items from the table that are shown between 14 minutes and 10 seconds and 14 minutes and 30 seconds, if a 20 second preceding time window is used. Time windows of other sizes may be used to identify items occurring at about a time. Also, a time window may be dynamically adjusted, such as when no items are located at a given time. In such cases, the shopping facilitator 100 may use progressively larger time windows until at least one item is it found. Time windows may be adjusted for other reasons as well, such as in response to a user input requesting additional items shown at about a specified time. In addition, although program time (e.g., the elapsed time since the beginning of a media content event) is used in the above examples, other embodiments may use absolute time (e.g., wall clock).

In some embodiments, the shopping facilitator 100 identifies items with respect to particular frames, images, or scenes included in a media content event. For example, where a media content event is represented as a series of images or frames (e.g., I-frames, P-frames, B-frames) the shopping facilitator 100 may retrieve one or more images or frames that precede the reception of the indication of interest from the user. These images may be associated with metadata such as is shown in table 300, such that the shopping facilitator 100 can determine items appearing therein. In other embodiments, object recognition techniques may be used to process such images to determine items appearing therein.

The shopping facilitator 100 may obtain the item information shown in table 300 from various sources. In one embodiment, the item information is provided along with a media content event stream or other signal received by the media device 110. In another embodiment, the media device 110 obtains the item information by requesting it from the program distributor 140 or some other source, such as the item information provider 144.

The shopping facilitator 100 may use more or less information, information of different types, and/or information organized in other ways to identify items shown in media content events. In one embodiment, the shopping facilitator 100 stores an inverted index or other mapping that can be used to efficiently determine or identify one or more items shown in a media content event at a given time. Also, the table 300 may include other types of information stored in other fields and/or locations. As one example, items may be associated with one or more preferred merchants that deal in the item (or type of item) represented.

In other embodiments, the shopping facilitator 100 may use information about the user to determine or identify items of interest and/or to perform other functions. In one embodiment, the shopping facilitator 100 may filter, narrow, or otherwise select items of interest based at least in part upon demographic information, such as age, gender, location, occupation, or the like. As one example, the shopping facilitator 100 may utilize the zip code of the viewer to provide information about local merchants that provide items of interest. As another example, given a scene that shows a sports car driven by a woman wearing a dress, the shopping facilitator 100 may utilize the fact that the user is male to determine that the user is most likely interested in the sports car and not the dress.

In some embodiments, the shopping facilitator 100 may interact with social networking services or systems to share information about items of interest with other people who are in a user's social network. For example, the shopping facilitator 100 may transmit indications of items of interest to a social networking service, such that those items appear in conjunction with an account or other personal space shared by the user via the social networking service. In this manner, a user can easily share his or her likes (or dislikes) with his or her friends or other connections.

Figure 4:
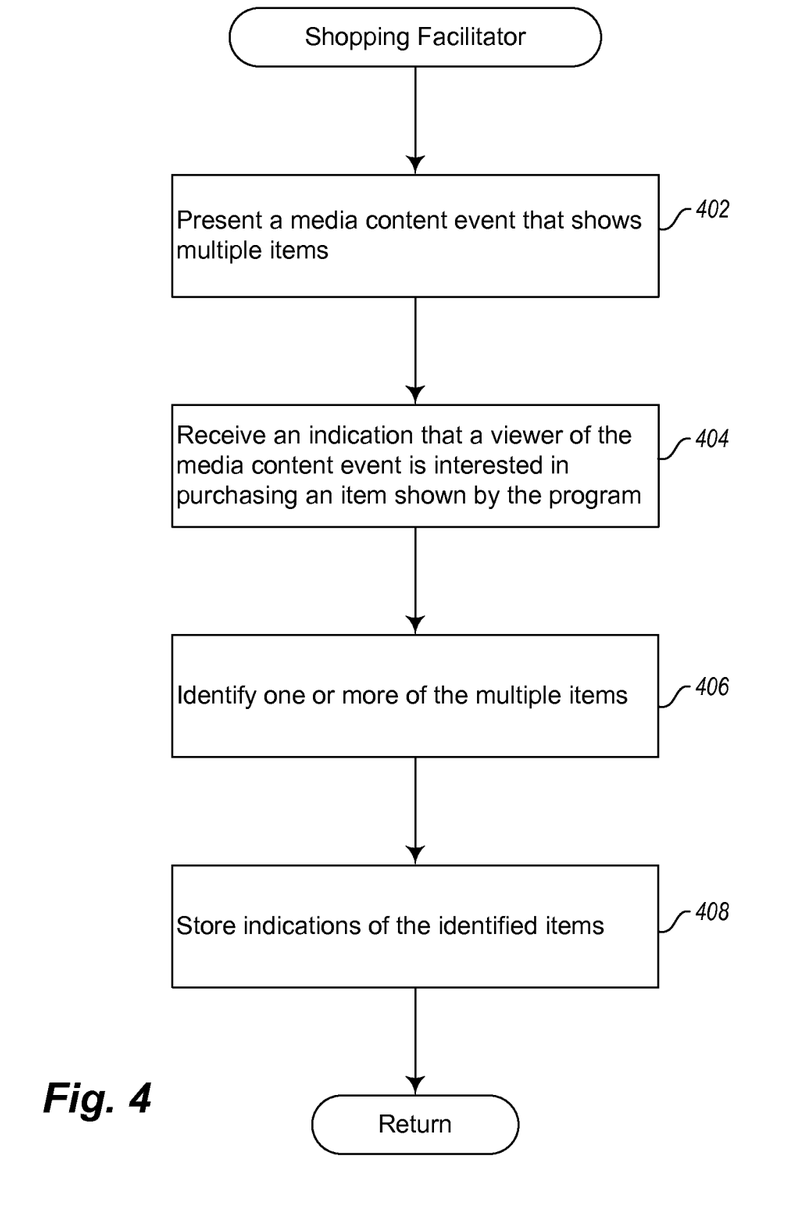
FIG. 4 is a flow diagram of a shopping facilitator process provided by an example embodiment.

FIG. 4 is a flow diagram of a shopping facilitator process provided by an example embodiment. The illustrated process may be provided by, for example, one or more components of the shopping facilitator 100. The illustrated process facilitates shopping for items shown in media content events by identifying and storing indications of such items as they are selected by a viewer.

The process begins at block 402, where it presents a media content event that shows multiple items. Presenting a media content event may include displaying a media content event on a presentation device such as a television or computer display. In at least some embodiments, the media content event is presented without indications that any of the multiple items are available for purchase.

At block 404, the process receives an indication that a viewer of the media content event is interested in purchasing items shown by the media content event. In some embodiments, receiving the indication includes receiving a media content event identifier and an indication of a time that occurs during presentation of the media content event. Such information may be stored and/or utilized later to determine or identify items that are of interest to the viewer, as described further below.

At block 406, the process identifies one or more of the multiple items shown by the media content event, where the one or more items include the item that the viewer is interested in purchasing. In some embodiments, identifying the one or more items may include referencing or otherwise accessing metadata about the media content event. For example, the metadata may associate items that are shown in the media content event with corresponding times at which they are shown, such that the process can determine items that are shown at about the time that the indication of interest was received from the viewer.

In other embodiments, identifying the one or more items may include identifying a plurality of items shown at about the time that the indication of interest was received from the viewer, and presenting to the viewer a selection menu that includes the plurality of items. The viewer may then use the selection menu to further specify which items are of interest to the viewer. In still other embodiments identifying one or more items may include automatically performing image recognition to identify the items in an image or a scene from the media content event. Such image recognition may be performed in an on-line or off-line manner, possibly depending on the computational characteristics of the computing system (e.g., media device) that is executing the process.

At block 408, the process stores indications of the identified items. The process may then perform further functions with the stored indications. For example, the process may display or otherwise provide a shopping facility that includes information about the identified items. The shopping facility may be accessed in various ways by the viewer or some other user. For example, the shopping facility may be presented as part of an electronic program guide displayed by a media device on a presentation device. In other embodiments, the shopping facility may be presented during a commercial break or as part of a screensaver presented by a media device. In yet other embodiments, the shopping facility may be accessed as a Webpage from a computing device such as a smart phone or other mobile device.

Figure 5:
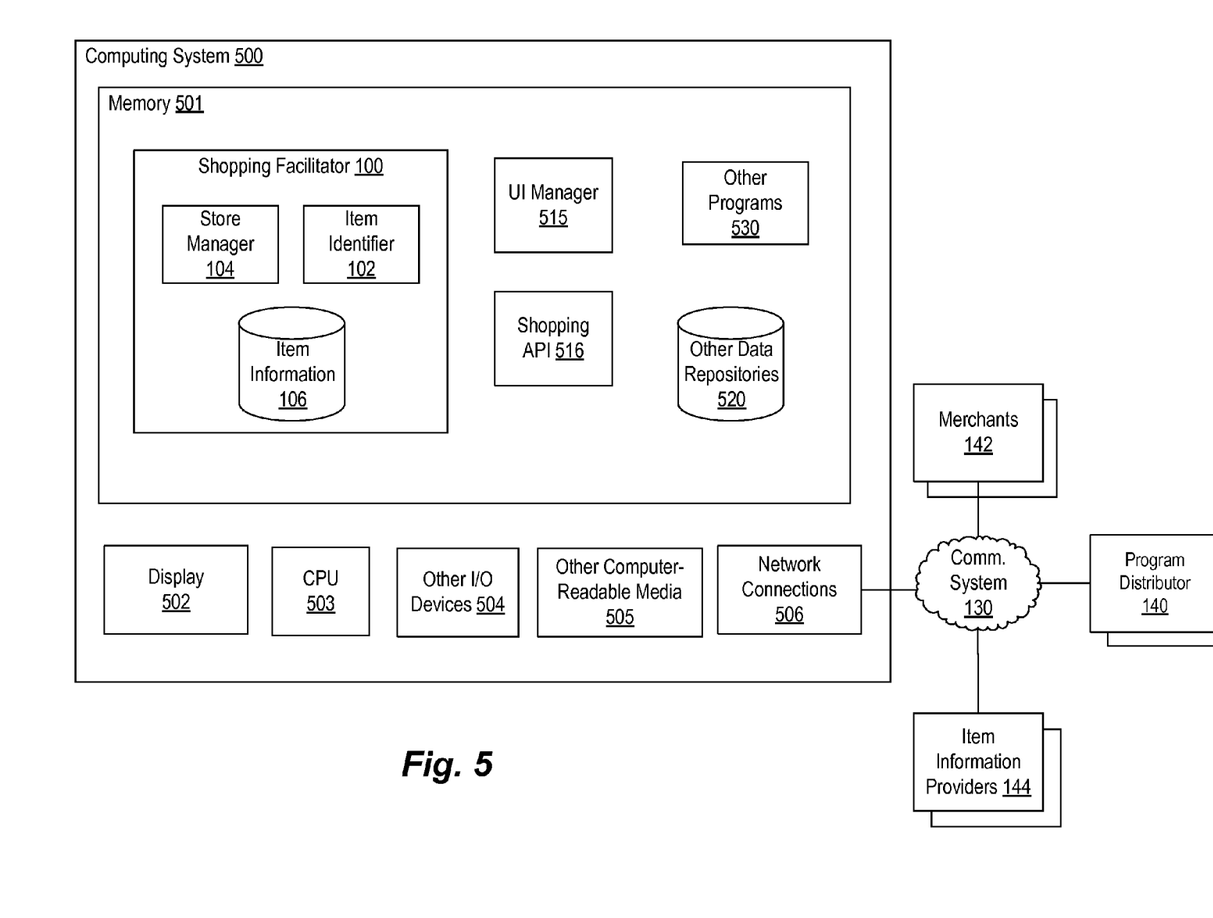
FIG. 5 is a block diagram of a computing system for practicing example embodiments of a shopping facilitator.

FIG. 5 is a block diagram of a computing system for practicing example embodiments of a shopping facilitator. FIG. 5 shows a computing system 500 that may be utilized to implement a shopping facilitator 100. In one embodiment, the computing system 500 is part of a set-top box or other media device 110 configured to receive and display media content events on a presentation device 120. In other embodiments, the computing system 500 is part of a presentation device 120, such as a television.

In the embodiment shown, the computing system 500 comprises a computer memory ("memory") 501, a display 502, one or more Central Processing Units ("CPU") 503, Input/Output ("I/O") devices 504 (e.g., audio processor, video processor, keyboard, mouse, CRT or LCD display cards or drivers, and the like), other computer-readable media 505, and network connections 506. The shopping facilitator 100 is shown residing in memory 501. In other embodiments, some portion of the contents, some of, or all of the components of the shopping facilitator 100 may be stored on and/or transmitted over the other computer-readable media 505. The components of the shopping facilitator 100 preferably execute on one or more CPUs 503 and facilitate shopping for items appearing in media content events, as described herein. Other code or programs 530 (e.g., an audio/video processing module, a program guide manager module, a Web browser or server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer-readable media 505 or a display 502.

The memory 501 also includes a user interface manager 515 and a shopping application program interface ("API") 516. The user interface ("UI") manager 515 provides a view and a controller that facilitate user interaction with the shopping facilitator 100 and its various components. For example, the user interface manager 515 provides interactive graphical user interface elements such as those discussed with respect to FIGS. 2A-2D. As discussed, such user interfaces allow the user to specify items of interest, obtain information about items, and/or initiate transactions for items.

The API 516 provides programmatic access to one or more functions of the shopping facilitator 100. For example, the API 516 may provide a programmatic interface to one or more functions of the shopping facilitator 100 that may be invoked by one of the other programs 530 or some other module. In this manner, the API 516 facilitates the development of third-party software, such as user interfaces, plug-ins, news feeds, adapters (e.g., for integrating functions of the shopping facilitator 100 into Web applications), and the like. In addition, the API 516 may be in at least some embodiments invoked or otherwise accessed via remote entities, such as code executing on a remote client device, to access various functions of the shopping facilitator 100. For example, an application on a mobile device may obtain indications of items of interest via the API 516. As another example, one of the merchants 142 may push information about items of interest to the shopping facilitator 100 via the API 516. The API 516 may also be configured to provide code modules that can be integrated into third-party applications and that are configured to interact with the action shopping facilitator 100 to make at least some of the described functionality available within the context of other applications.

In an example embodiment, components/modules of the shopping facilitator 100 are implemented using standard programming techniques. For example, the shopping facilitator 100 may be implemented as a "native" executable running on the CPU 503, along with one or more static or dynamic libraries. In other embodiments, the shopping facilitator 100 may be implemented as instructions processed by a virtual machine that executes as one of the other programs 530. In general, a range of programming languages known in the art may be employed for implementing such example embodiments.

In addition, the embodiments described above may also be structured in various ways, including but not limited to, multiprogramming, multithreading, client-server, or peer-to-peer, running on one or more computer systems each having one or more CPUs. Some embodiments may execute concurrently and asynchronously, and communicate using message passing, pipes, signals, or other communication techniques. Also, other functions could be implemented and/or performed by each component/module, and in different orders, and by different components/modules, yet still achieve the described techniques.

Furthermore, in some embodiments, some or all of the components of the shopping facilitator 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be non-transitorily stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be emphasized that the above-described embodiments of the shopping facilitator 100 are merely possible examples of implementations of the described techniques. Many variations and modifications may be made to the above-described embodiments. All such modifications and variations are intended to be included herein within the scope of this disclosure and protected by the following claims.

The invention claimed is:

1. A method in a media distribution system, comprising:
presenting, by a media device, a media content event that shows multiple items without indications that any of the multiple items are available for purchase;
at a time occurring during the presentation of the media content event, receiving an indication that a viewer of the media content event is interested in purchasing an item shown by the media content event, wherein receiving the indication comprises receiving a media content event identifier and an indication of the time occurring during the presentation of the media content event;
identifying, based at least in part on the time, one or more of the multiple items, the identified one or more of the multiple items being shown by the media content event at about the time and including the item that the viewer is interested in purchasing, wherein identifying the one or more items comprises identifying the items without pausing presentation of the media content event, wherein identifying the one or more items includes searching an item information table to find an entry that associates an item with a program identifier, a begin time, and an end time, wherein the item is shown during the media content event starting at the being time and ending at the end time, wherein the program identifier matches the media content event identifier, and wherein the time occurring during the presentation of the media content event is within a dynamically adjusted time window of the being time and the end time, wherein the dynamically adjusted time window is made progressively larger until at least one item is found; and
storing indications of the identified one or more items by storing an indication of the item found in the item information table.

2. The method of claim 1 wherein identifying the one or more items includes:
referencing metadata included as part of the media content event, the metadata associating items that are shown in the media content event with corresponding times at which they are shown; and
determining that the one or more items are shown by the media content event within a time interval preceding the time.

3. The method of claim 1 wherein identifying the one or more items comprises:
identifying the items without providing any indication to the viewer that the one or more items have been identified.

4. The method of claim 1 further comprising:
identifying a plurality of items shown at about the time during the presentation of the media content event, presenting to the viewer a selection menu that includes the plurality of items, and receiving an indication that the one or more items have been selected by the viewer from the selection menu.

5. The method of claim 1 wherein identifying the one or more items comprises:
identifying the one or more items offline, after presentation of the media content event, and at a location that is remote from the media device.

6. The method of claim 1, further comprising:
transmitting information about the identified one or more items to the viewer.

7. The method of claim 1, further comprising:
transmitting information about the identified one or more items to a social networking system for access by one or more other users who are in a social network of the viewer.

8. The method of claim 1 wherein identifying the one or more items comprises:
identifying the one or more items based at least in part on information about the viewer, including at least one of gender, age, and location.

9. The method of claim 1, further comprising:
providing an offer from a local merchant to sell one of the identified one or more items to the viewer, the local merchant selected based on a location associated with the viewer.

10. The method of claim 1, wherein identifying the one or more items includes:
retrieving an image from a series of images in the media content event, wherein the retrieved image precedes reception of the indication of the item that the viewer is interested in purchasing; and
by the media distribution system, automatically performing image recognition to identify the one or more items shown in the retrieved image.

11. The method of claim 1, further comprising:
dynamically adjusting the time window in response to a user input requesting additional items shown at about the time occurring during the presentation of the media content event.

12. The method of claim 6 wherein transmitting the information comprises:
providing the information as part of an online shopping facility configured to facilitate sale of at least one of the one or more items to the viewer.

13. The method of claim 6 wherein transmitting the information comprises:
presenting the information as part of an electronic program guide displayed by the media device.

14. The method of claim 6 wherein transmitting the information comprises:
presenting the information as a screen saver displayed by the media device.

15. The method of claim 10, further comprising:
performing the image recognition in an on-line or off-line manner, depending on computational characteristics of the media device.

16. A system comprising:
a media device configured to:
present a media content event that shows multiple items without indications that any of the multiple items are available for purchase; and
at a time occurring during the presentation of the media content event, receive an indication that a viewer of the media content event is interested in purchasing an item shown by the media content event, the media device configured to receive the indication b receiving a media content event identifier and an indication of the time occurring during the presentation of the media content event; and
a shopping facilitator module configured to:
identify, based at least in part on the time, one or more of the multiple items, the identified one or more items being shown by the media content event at about the time and including the item that the viewer is interested in purchasing, wherein the shopping facilitator module identifies the one or more items by identifying the items without pausing presentation of the media content event, the shopping facilitator module configured to identify the one or more items b searching an item information table to find an entry that associates an item with a program identifier, a begin time, and an end time, wherein the item is shown during the media content event starting at the begin time and ending at the end time, wherein the program identifier matches the media content event identifier, and wherein the time occurring during the presentation of the media content event is within a d dynamically adjusted time window of the be in time and the end time, wherein the dynamically adjusted time window is made progressively larger until at least one item is found; and store indications of the identified one or more items by storing an indication of the item found in the item information table.

17. The system of claim 16 wherein the shopping facilitator module is further configured to:
receive metadata that associates items that are shown in the media content event with corresponding times at which they are shown, the metadata received from a source other than the media content event and remote from the media device.

18. The system of claim 16 wherein the shopping facilitator module is further configured to:
concurrently receive indications of interest from multiple users each using a distinct input device that is one of a remote control device, a smart phone, or a mobile computing device; and
provide distinct shopping facilities for each of the multiple users, each shopping facility customized for a corresponding user based on indications of interest received from that user.

19. The system of claim 16 wherein the shopping facilitator module is part of a program distributor that transmits the media content event to the media device.

20. A method in a media device that is presenting a media content event that shows multiple items, comprising:
at a time occurring during the presentation of the media content event, receiving an indication that a viewer of the media content event is interested in purchasing an item shown by the media content event, wherein receiving the indication comprises receiving a media content event identifier and an indication of the time occurring during the presentation of the media content event;
identifying, without indicating that any of the multiple items shown by the media content event are available for purchase, one or more of the multiple items, the identified one or more items being shown by the media content event at about the time and including the item that the viewer is interested in purchasing, wherein identifying the one or more items comprises identifying the items without pausing presentation of the media content event, wherein identifying the one or more items includes searching an item information table to find an entry that associates an item with a program identifier, a begin time, and an end time, wherein the item is shown during the media content event starting at the begin time and ending at the end time, wherein the program identifier matches the media content event identifier, and wherein the time occurring during presentation of the media content event is within a dynamically adjusted time window of the begin time and the end time, wherein the dynamically adjusted time window is made progressively larger until at least one item is found; and
storing indications of the identified one or more items by storing an indication of the item found in the item information table.

* * * * *